(12) United States Patent
Popescu et al.

(10) Patent No.: US 8,990,405 B2
(45) Date of Patent: Mar. 24, 2015

(54) METHODS, SYSTEMS AND ARTICLES OF MANUFACTURE TO RESUME A REMOTE DESKTOP SESSION

(75) Inventors: Valentin Popescu, Tomball, TX (US); Paul Michael Anderson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 13/078,636

(22) Filed: Apr. 1, 2011

(65) Prior Publication Data

US 2012/0254447 A1 Oct. 4, 2012

(51) Int. Cl.
*G06F 15/16* (2006.01)
*H04L 29/06* (2006.01)

(52) U.S. Cl.
CPC ............... *H04L 69/22* (2013.01); *H04L 67/40* (2013.01); *H04L 63/0442* (2013.01); *H04L 63/12* (2013.01)
USPC ......................................................... 709/227

(58) Field of Classification Search
CPC ..... H04L 69/22; H04L 67/40; H04L 63/0442; H04L 63/12
USPC ......................................... 709/226, 223, 227
See application file for complete search history.

(56) References Cited

U.S. PATENT DOCUMENTS

| | | | |
|---|---|---|---|
| 7,461,260 B2 | 12/2008 | Drews et al. | |
| 7,685,298 B2 | 3/2010 | Day et al. | |
| 8,108,525 B2 * | 1/2012 | Kumar et al. | 709/227 |
| 8,589,575 B2 * | 11/2013 | Ramachandra et al. | 709/230 |
| 2008/0235361 A1 * | 9/2008 | Crosbie et al. | 709/223 |
| 2009/0006537 A1 | 1/2009 | Palekar et al. | |
| 2009/0037763 A1 * | 2/2009 | Adhya et al. | 714/4 |
| 2009/0210519 A1 | 8/2009 | Zill et al. | |
| 2009/0216975 A1 | 8/2009 | Halperin et al. | |
| 2010/0217874 A1 | 8/2010 | Anantharaman et al. | |

OTHER PUBLICATIONS

Microsoft, "Connect to a user session", Feb. 19, 2011, pp. 1-2.*
IETF, RFC 2608/Update 2165, "Service Location Protocol, Version 2", Jun. 1999, pp. 1-38.*
IBM, "SLP direcotry agent configuration", 2010, pp. 1-2.*
HP Remote Graphics Software User Guide 5.4.5, Jan. 2011, 247 pages.
HP Session Allocation Manager v3.1, May 2010, 4 pages.

(Continued)

*Primary Examiner* — Jung Park
*Assistant Examiner* — Albert Shih
(74) *Attorney, Agent, or Firm* — Hanley Flight & Zimmerman, LLC (57) ABSTRACT

Example methods, systems and articles of manufacture to resume remote desktop sessions are disclosed. A disclosed example method to resume a remote desktop session with a first computing device includes sending a query packet containing a first value representing a user identifier from a second computer device to a third computing device, receiving a response packet containing a second value representing the first computing device from the third computing device, and resuming at the second computing device the remote desktop session with the first computing device using the value.

15 Claims, 7 Drawing Sheets

(56) References Cited

OTHER PUBLICATIONS

Microsoft, Understanding the Remote Desktop Protocol (RDP), last review Mar. 27, 2007, retrieved from http://support.microsoft.com/default.aspx?scid=kb;EN-US;q186607, on Oct. 30, 2013, 2 pages.

Vettorello, Marco et al., "Some Notes on Security in the Service Location Protocol Version 2 (SLPv2)," 2001, 10 pages.

* cited by examiner

METHODS, SYSTEMS AND ARTICLES OF MANUFACTURE TO RESUME A REMOTE DESKTOP SESSION

BACKGROUND

A remote desktop session allows a person working at a local computer to view and manipulate the desktop of a remote computer over a network as if the person were sitting in front of that remote computer. Remote desktop sessions may be implemented, for example, using the Microsoft® remote desktop protocol, virtual network computing (VNC) software and/or HP® remote graphics software.

DETAILED DESCRIPTION

Increasingly, computer users want to be able to establish a remote desktop session to a remote computer using a first computer and then move to a second computer and resume that same remote desktop session from the second computer, without losing any work. Typical remote connection clients require an identifier for the remote computer (e.g., a hostname or an Internet protocol (IP) address assigned to the remote computer) in order to establish and/or resume a remote desktop session. Accordingly, to resume a remote desktop session at the same and/or a different computer, a user needs to know and/or be able to determine the remote computer's identifier. In some environments, the remote computer may change from day to day, depending on resource constraints. For example, a hostname and/or IP address may be re-assigned from a first remote computer to a second remote computer. Thus, the user has traditionally been required to remember and/or make a note of the remote computer's hostname or IP address in order to resume the remote desktop session. Unfortunately, hostnames and/or IP addresses may change from day to day or even from connection to connection, depending on network rules, further frustrating the user's efforts to resume remote desktop sessions.

Example methods, systems and articles of manufacture to resume remote desktop sessions disclosed herein unburden users from having to remember and/or record remote computer identifiers (e.g., a hostname and/or an IP address). Examples disclosed herein enable a user to automatically locate and/or restore any or all of their existing remote desktop sessions from the same and/or different computers. The remote desktop sessions are automatically located and/or identified based on a user identifier (e.g., a username, an NT domain name such as domain\user, a SEA address such as user@domain, and/or a user-specific UUID used by a directory service) associated with and/or assigned to a user, and a list of automatically identified remote desktop sessions is presented to the user. The user selects which, if any, of the identified remote desktop sessions are to be resumed. As a result, the user at no time needs to be aware of a remote computer's identifier.

A disclosed example method to resume a remote desktop session with a first computing device includes sending a query packet containing a first value representing a user identifier from a second computer device to a third computing device, receiving a response packet containing a second value representing the first computing device from the third computing device, and resuming at the second computing device the remote desktop session with the first computing device using the value.

A disclosed example system to resume a remote desktop session includes a first computer including a user agent, the user agent to multicast a query packet containing a first value representing a user identifier, and a second computer including a service agent, the service agent to send a response packet in response to the query packet, the response packet containing a second value representing a remote computer providing the remote desktop session associated with the user identifier.

A disclosed example tangible article of manufacture stores machine-readable instructions that, when executed, cause a machine to at least receive from a first computing device a query packet containing a first value representing a user identifier, and send to the first computing device a response packet containing a second value representing a second computing device providing a remote desktop session associated with the user identifier.

Figure 1:
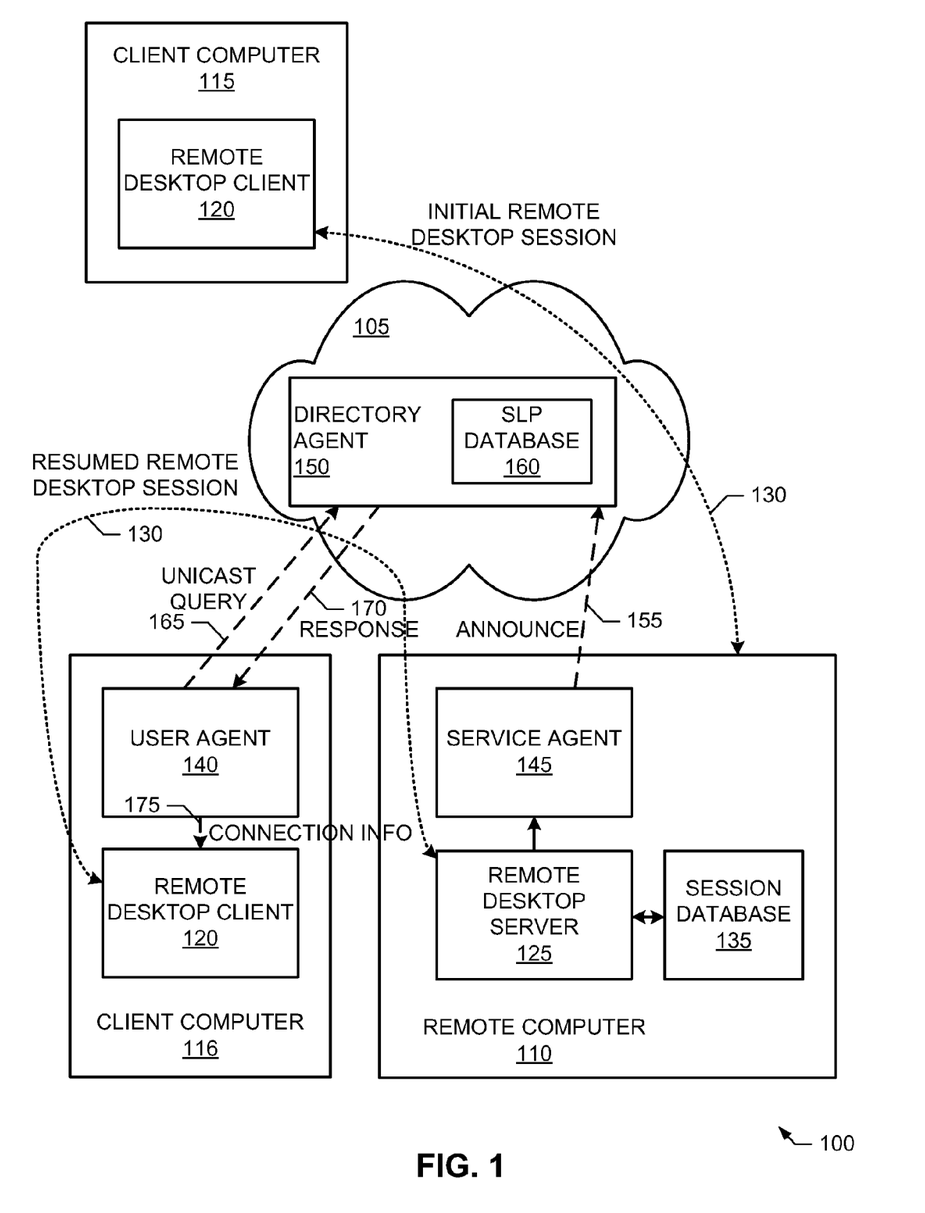
FIGS. 1 and 2 are example systems to resume remote desktop sessions.

FIG. 1 illustrates an example system 100 to resume remote desktop sessions constructed in accordance with the teachings of this disclosure. To provide remote desktop sessions via any type of network 105, the example system 100 of FIG. 1 includes any number of remote computers 110 and any number of client computers 115 and 116. Within particular examples disclosed herein, the computers 110, 115, 116 are referred to as a client computer and/or a remote computer. However, the identification of a particular computer as a client computer or a remote computer only relates to a particular remote desktop session. The term "client computer" (e.g., any of the client computers 115, 116) refers herein to a computer executing and/or implementing any number and/or type(s) of remote desktop client(s) 120 that is usable by a person to view and manipulate the desktop of a remote computer (e.g., the remote computer 110), as if the person were sitting in front of that remote computer. The term "remote computer" (e.g., the remote computer 110) refers herein to a computer executing and/or implementing any number and/or type(s) of remote desktop server(s) 125 to enable a user of a client computer (e.g., any of the client computers 115, 116) to control the remote computer, as if the person were sitting in front of the remote computer. A computer may operate as a client computer for a first remote desktop session and as a remote computer for a second remote desktop session, simultaneously and/or or different times. The adjectives "client" and "remote" serve to clarify a computer's functionality during descriptions of the example system 100 and an example system 200 (FIG. 2) at a particular point in time for a particular remote desktop session. Furthermore, the use of the adjective "remote" in "remote computer" does not imply or in any way require a geographic separation between two computers. In fact, a client computer and a remote computer may be physically adjacent, although physical separation by any distance (e.g., miles, kilometers, etc.) is also envisioned. The term "remote desktop session" refers herein to a communication session established to enable a person working at a local computer to view the desktop of, and/or control and/or operate a remote computer over a network as if the person were sitting in front of that remote computer. In some examples, a remote desktop session may be hosted by the local computer so that the local computer operates as both client and remote. Accordingly, as used herein, a remote desktop session is different from a terminal session, a remote login session, a web page and/or other web-based interfaces.

When the example client computers 115, 116 and the example remote computer 110 interact to establish a remote desktop session (e.g., a remote desktop session 130) and/or to terminate a remote desktop session, the example remote desktop server 125 of FIG. 1 updates a session database 135. The example session database 135 of FIG. 1 may be any type(s) and/or number of data structure(s) and/or list(s) such as a session database implemented as a part of and/or in conjunction with the remote desktop server 125. The session database 135 need not be implemented using, for example, a relational database. Further, remote desktop session information may be stored in the example session database 135 of FIG. 1 using any number and/or type(s) of data structure(s). The example session database 135 may be implemented by any number and/or type(s) of volatile and/or non-volatile memory(-ies), memory device(s) and/or storage device(s).

To enable a user to resume remote desktop sessions, the example client computer 116 of FIG. 1 includes a user agent 140, the example remote computer 110 of FIG. 1 includes a service agent 145, and the example system 100 of FIG. 1 includes a directory agent 150. In the illustrated example of FIG. 1, the example user agent 140 and the example service agent 145 may be implemented as machine-readable instructions stored on a tangible computer-readable medium and executed by one or more processors of the client computer 116 and the remote computer 110, respectively. The example directory agent 150 may be implemented as machine-readable instructions stored on a tangible computer-readable medium and executed by one or more processors of a server (not shown for ease of illustration). In the illustrated example of FIGS. 1 and 2, the example user agent 140, the example service agent 145 and the example directory agent 150 are implemented in accordance with a service discovery protocol such as the service location protocol (SLP) defined by Internet Engineering Task Force (IETF) Request for Comment (RFC) 2608 and IETF RFC 3224. Additionally or alternatively, the example user agent 140, the example service agent 145 and the example directory agent 150 may be implemented in accordance with a zero-configuration (Zeroconf) protocol such as a universal plug and play (UPNP) protocol, an Apple® Bonjour® protocol, a service location protocol (SLP), a dynamic domain name system (DDNS) protocol, a proprietary protocol and/or a custom protocol.

When a remote desktop session (e.g., the example remote desktop session 130) is established, resumed and/or terminated, the example service agent 145 of FIG. 1 sends an SLP announcement and/or notification 155 to the example directory agent 150 to identify the remote desktop session establishment, resumption and/or termination. In other words, the example service agent 145 announces a service corresponding to the remote desktop session and/or revokes a service corresponding to a terminated remote desktop session. In some examples, the example SLP announcement and/or notification 155 is an SLP request. The directory agent 150 need not be able to parse and/or understand the content of the SLP request. Instead, the directory agent 150 can stores the SLP request along with any other SLP packets. The directory agent 150 can simply return SLP packets matching an SLP request and/or query without reference to the contents of the SLP packets.

In response, the example directory agent 150 of FIG. 1 updates an SLP database 160. The example SLP database 160 may be any type(s) and/or numbers and/or data structure(s) and/or list(s). The SLP database 160 need not be implemented using, for example, a relational database. Further, remote desktop session information may be stored in the example SLP database 160 of FIG. 1 using any number and/or type(s) of data structure(s). The example SLP database 160 may be implemented by any number and/or type(s) of volatile and/or non-volatile memory(-ies), memory device(s) and/or storage device(s).

Figure 6:
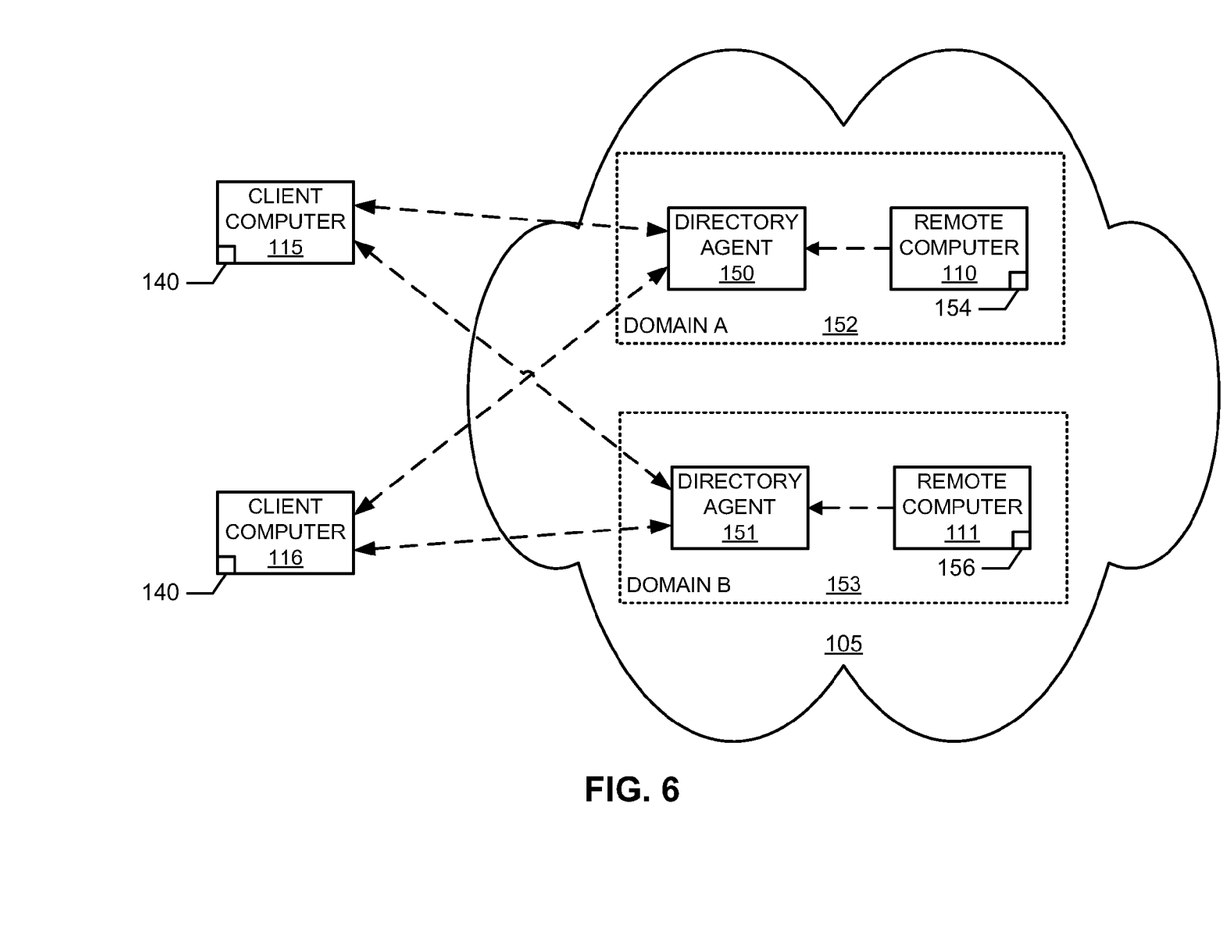
FIG. 6 is an example system to resume a remote desktop session.

To resume the remote desktop session 130 from the example client computer 116, a user initiates, opens, resumes and/or causes the computer to execute the example user agent 140. The example user agent 140 of FIG. 1 prompts the user for one or more user identifiers (e.g., a username, an NT domain name such as domain\user, a SEA address such as user@domain, a user-specific UUID used by a directory service, etc.) and computes a cryptographic hash value of the user identifier(s) using, for example, a hash algorithm such as, but not limited to, a message-digest algorithm (e.g., MD5) and/or a secure hash algorithm (e.g., SHA-1, SHA-2, etc.). The example user agent 140 then initiates an SLP discovery by sending a SLP query 165. Because the example system 100 of FIG. 1 includes the example directory agent 150, the example user agent 140 sends the SLP query 165 to the directory agent 150 using unicast (e.g., a directed packet addressed to the directory agent 150). The example query 165 of FIG. 1 includes the computed cryptographic hash and, optionally, a public encryption key associated with the user. Alternatively, the user identifier(s) may be transmitted without being cryptographically hashed, if user privacy and/or security is not needed and/or desired, and/or without the public encryption key if, for example, the public encryption key was previously and/or separately provided. The example user agent 140 of FIG. 1 can identify the directory agent 150 using any number and/or type(s) of technique(s), protocol(s) and/or method(s) such as multicast, dynamic host configuration protocol (DHCP) and/or domain name service (DNS) depending on the configuration of the network 105. As illustrated in the example of FIG. 6, when there are multiple directory agents 150, 151 configured in the network 105, the user agent 140 of FIG. 1 can send the SLP query 165 to each of the directory agents 150, 151. If the network 105 includes multiple domains A 152 and B 153 (FIG. 6), the example network 105 may include a directory agent 150, 151 in each domain 152, 153 with the client computers 115, 116 made aware of each of the directory agents 150, 151 to enable resumption of remote desktop sessions 154, 156 at remote computers 110, 111 across any number of network domains 152, 153 (e.g., 1, 2, 3, etc.).

When the directory agent 150 receives the SLP query 165, the example directory agent 150 of FIG. 1 identifies any remote desktop sessions associated with the user by comparing the cryptographic hash contained in the query 165 with cryptographic hashes computed for the user identifier(s) associated with each remote desktop session identified in the SLP database 160. If no matches are found, the SLP query 165 is discarded. Alternatively, the example directory agent 150 may send an SLP response that indicates, for example, "no remote desktop sessions identified." For each match that is found (i.e., each remote desktop session associated with the user), the example directory agent 150 sends a corresponding SLP response 170. For example SLP response 170 contains and/or includes a remote computer identifier (e.g., a hostname, an IP address, a transmission control protocol (TCP) port address, a session identifier, and/or a human readably session name that the user has assigned to the remote desktop session such as "My Work Computer") associated with the remote computer 110 providing the corresponding identified remote desktop session. In the illustrated example of FIG. 1, the example remote computer identifier is encrypted using the public key contained in the SLP query 165. When the SLP query 165 does not contain a public key, the directory agent 150 may ignore the SLP query 165, send an SLP response 170 including an unencrypted remote computer identifier, and/or send as encrypted response 170 using a previously and/or separately received public encryption key, depending on the configuration of the directory agent 150. Alternatively, the SLP response 170 may contain identifying information for more than one remote desktop session identified as associated with the user.

When the user agent 140 receives the SLP response(s) 170, the example user agent 140 of FIG. 1 extracts the (possibly encrypted) remote computer identifier(s) from the SLP response(s) 170. When the remote computer identifier is encrypted, the example user agent 140 decrypts the remote computer identifier using the private encryption key counterpart of the provided public encryption key. If the decryption is not successful, the user agent 140 discards the SLP response 170. When more than one valid SLP response 170 is received, the example user agent 140 presents to the user a list of the remote desktop sessions associated with the provided user identifier(s). For each remote desktop session selected by the user for resumption, the example user agent 140 provides connection information (e.g., the remote desktop identifier) 175 to the example remote desktop client 120. Using the connection information 175, the example remote desktop client 120 of FIG. 1 resumes the remote desktop session 130 with the remote computer 110.

Figure 2:
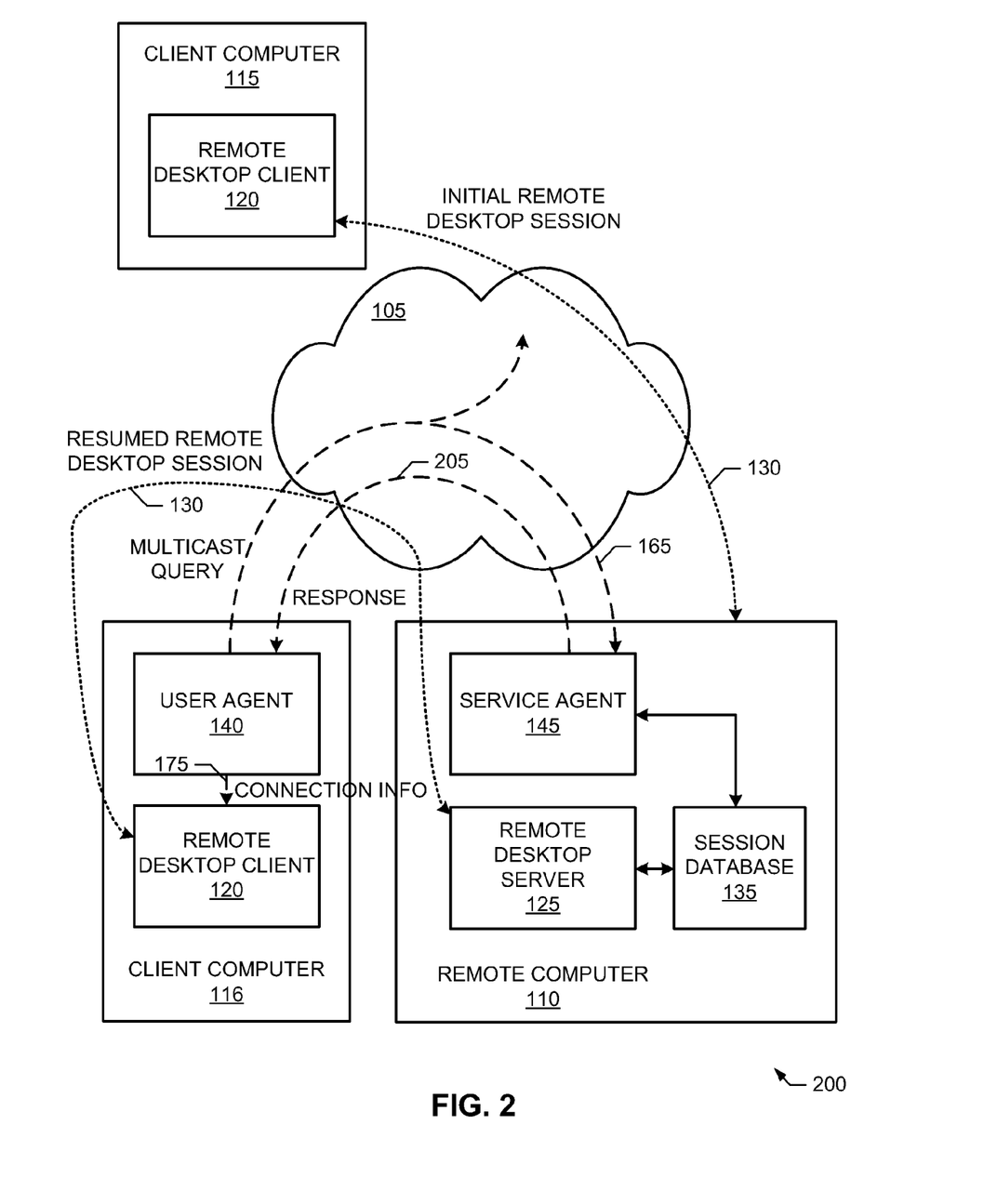

FIG. 2 illustrates another example system 200 to resume remote desktop sessions constructed in accordance with the teachings of this disclosure. Because portions of the example system 200 are similar and/or identical to those discussed above in connection with the example system 100 of FIG. 1, the description of those similar and/or identical portions are not repeated here. Instead, similar and/or identical elements and interactions are illustrated with identical reference numerals in FIGS. 1 and 2, and the interested reader is referred back to the descriptions presented above in connection with FIG. 1 for a complete description of those like numbered elements and interactions.

In comparison to the example system 100 of FIG. 1, the example system 200 of FIG. 2 does not include the example directory agent 150. For example, in a small network such as a home or small business network the directory agent 150 may not be needed. Accordingly, the example user agent 140 multicasts the example SLP query 165 for receipt and/or processing by any number of service agents (e.g., the example service agent 145) of the network 105. When the example service agent 145 of FIG. 1 receives the SLP query 165, the service agent 145 identifies remote desktop sessions associated with the user by comparing the cryptographic hash contained in the query 165 with cryptographic hashes computed for the user identifier(s) associated with each remote desktop session identified in the session database 135. If no matches are found, the SLP query 165 is discarded. Alternatively, the example service agent 145 may send an SLP response that indicates, for example, "no remote desktop sessions identified." For each match that is found (i.e., each remote desktop session associated with the user), the example service agent 145 sends a corresponding SLP response 205. Each of the example SLP response(s) 205 contains a remote computer identifier (e.g., a hostname and/or IP address) associated with the remote computer 110 associated with the service agent 145. In the illustrated example of FIG. 2, the example remote computer identifier is encrypted using the public key contained in the SLP query 165. When an SLP query 165 does not contain a public key, the service agent 145 may ignore the SLP query 165, send an SLP response 205 including an unencrypted remote computer identifier and/or send as encrypted response 170 using a previously and/or separately received public encryption key, depending on the configuration of the service agent 145.

While example systems 100 and 200 to resume remote desktop sessions are illustrated in FIGS. 1 and 2, one or more of the interfaces, controllers, elements and/or devices illustrated in FIGS. 1 and/or 2 may be combined, divided, rearranged, omitted, eliminated and/or implemented in any other way. Further, the example computers 110, 115 and 116, the example remote desktop clients 120, the remote desktop server 125, the example session database 135, the example user agent 140, the example service agent 145, the example directory agent 150 and/or the example SLP database 160 may be implemented by the example process platform P100 of FIG. 5 and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. When any apparatus claim of this patent incorporating one or more of these elements is read to cover a purely software and/or firmware implementation, at least one of the example computers 110, 115 and 116, the example remote desktop clients 120, the remote desktop server 125, the example session database 135, the example user agent 140, the example service agent 145, the example directory agent 150 and/or the example SLP database 160 is hereby expressly defined to include a tangible article of manufacture such as a tangible computer-readable medium storing the firmware and/or software. Further still, the example systems 100 and 200 may include interfaces, controllers, elements and/or devices instead of, or in addition to, those illustrated in FIGS. 1 and/or 2, and/or may include more than one of any or all of the illustrated interfaces, controllers, elements and/or devices.

Figure 3A:
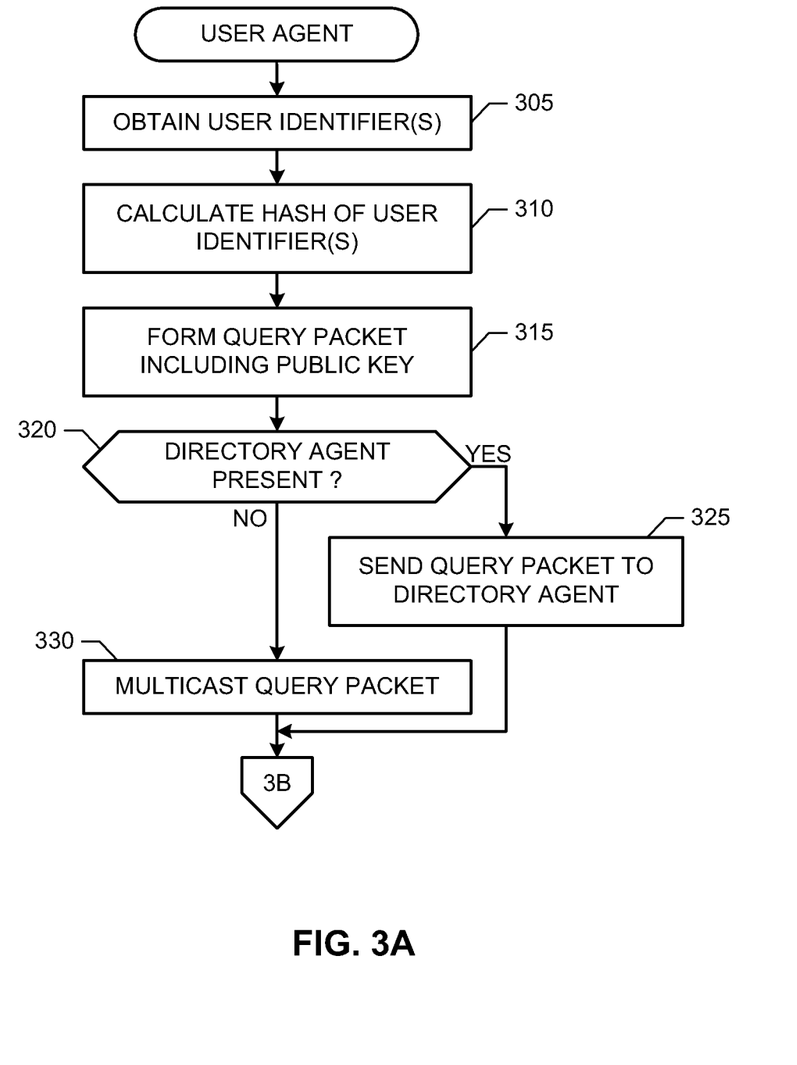
FIGS. 3A and 3B illustrates an example process that may, for example, be implemented using machine-accessible instructions executed by one or more processors to implement the example user agents of FIGS. 1 and/or 2.
Figure 3B:
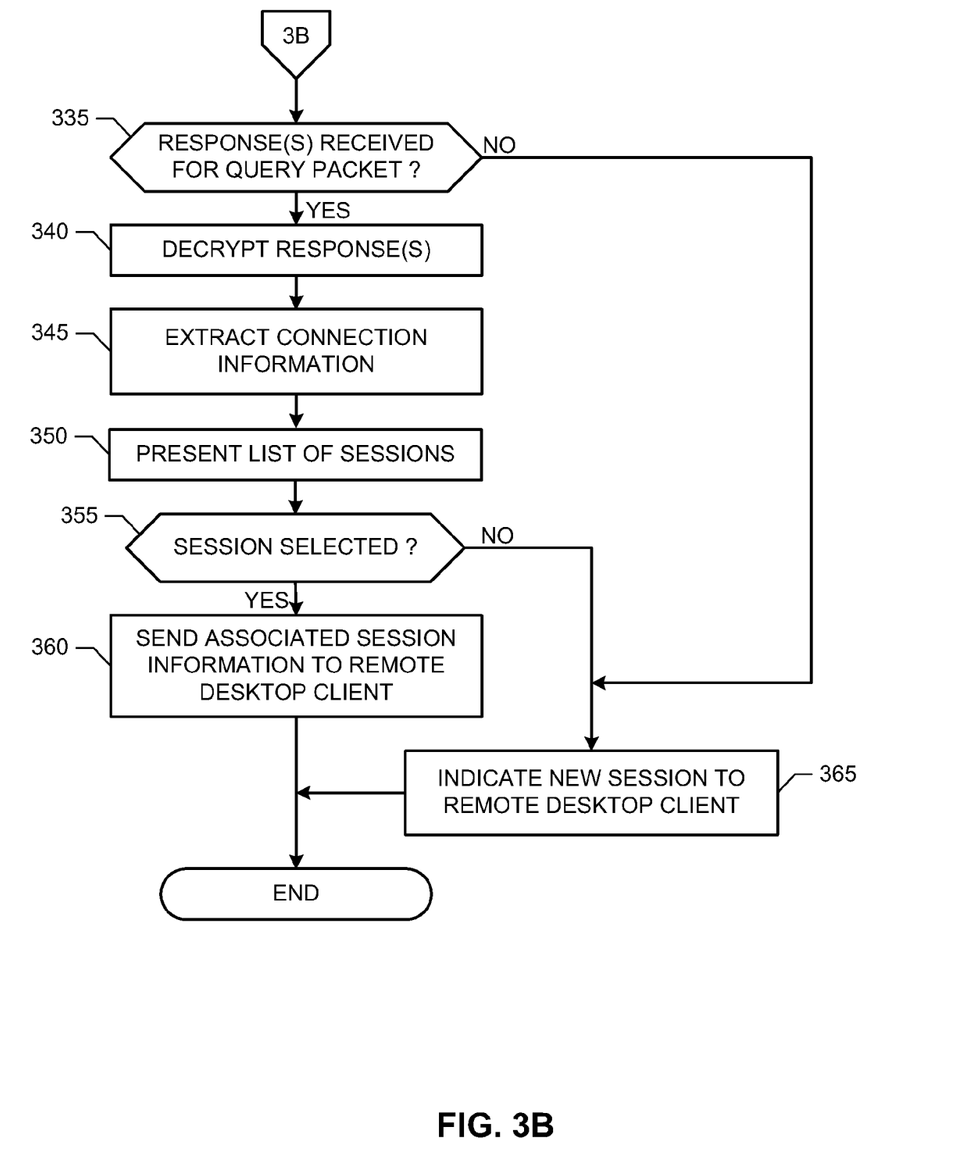

FIGS. 3A and 3B is a flowchart of an example process that may, for example, be implemented as machine-accessible instructions executed by one or more processors to implement the example user agents 140 of FIGS. 1 and/or 2. The example machine-accessible instructions of FIGS. 3A and 3B begin when the example user agent 140 obtains one or more user identifiers (e.g., a username and/or a password) from a user (block 305) and calculates a cryptographic hash of the user identifier(s) (block 310). The user agent 140 forms, generates and/or creates an SLP query (e.g., the example SLP query 165) that includes the cryptographic hash and may also include a public encryption key associated with the user (block 315).

If there are one or more directory agents (e.g., the example directory agent 150) present (block 320), the user agent 140 sends the SLP query to the directory agent(s) (block 325). If there is not a directory agent present (block 320), the user agent 140 multicasts the SLP query (block 330).

Continuing at block 335 of FIG. 3B, the user agent 140 waits to receive an SLP response (e.g., the example SLP response 170) for the currently pending and/or active SLP query (block 335). When an SLP response is received (block 335), the user agent 140 decrypts the remote computer identifier contained in the SLP response, if encrypted (block 340) and extracts the remote computer identifier (block 345).

The user agent 140 presents a list of the automatically identified remote desktop sessions (block 350). If the user selects any of the presented remote desktop sessions (block 355), the user agent 140 sends the session connection information to the remote desktop client 120 (block 360), and control exits from the example machine-accessible instructions of FIGS. 3A and 3B. As appropriate the remote desktop client 120 may request the user's password in order to resume the selected remote desktop session(s).

Returning to block 355, if the user does not select any of the presented remote desktop sessions (block 355), the user agent 140 informs, directs and/or notifies the remote desktop client 120 that a new remote desktop session is to be initiated (block 365), and control exits from the example machine-accessible instructions of FIGS. 3A and 3B.

Figure 4:
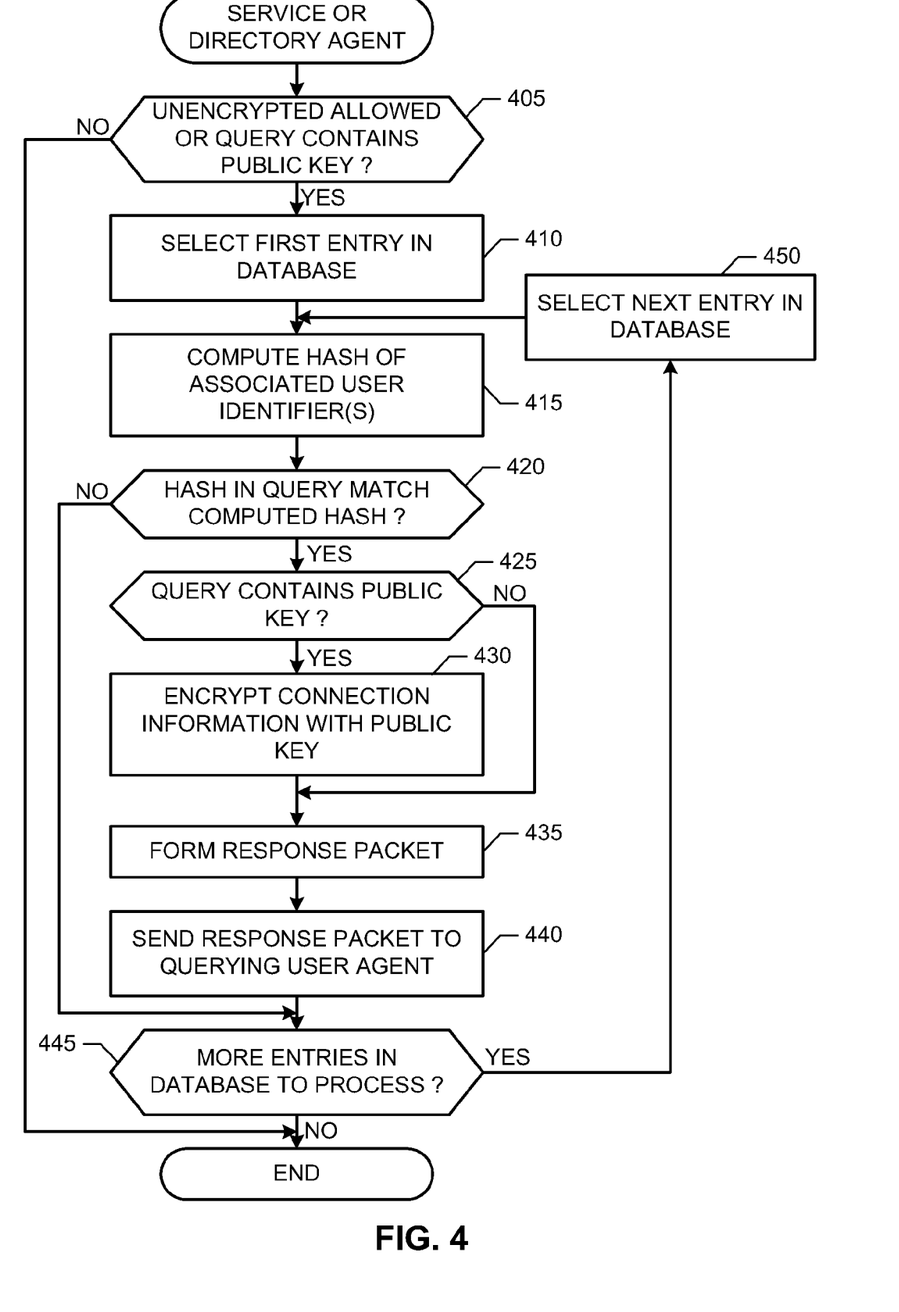
FIG. 4 illustrates an example process that may, for example, be implemented using machine-accessible instructions executed by one or more processors to implement the example service agents and/or the example directory agents of FIGS. 1, 2 and/or 6.

FIG. 4 is a flowchart of an example process that may, for example, be implemented as machine-accessible instructions carried out by one or more processors to implement the example service agents 145 and/or the example directory agents 150 of FIGS. 1 and/or 2. The example machine-accessible instructions of FIG. 4 begin when a serving agent (e.g., a service agent such as the example service agent 145 and/or a directory agent such as the example directory agent 150) receives an SLP query (e.g., the example SLP query 165). If the serving agent does not support unencrypted responses and the received SLP query does not contain a public encryption key (block 405), the SLP query is discarded and control exits from the example machine-accessible instructions of FIG. 4. Alternatively, the example serving agent may send an SLP response that indicates, for example, "no remote desktop sessions identified."

If the serving agent supports unencrypted responses and/or the received SLP query contains a public encryption key (block 405), the serving agents selects a first entry in a database (e.g., the example session database 135 and/or the example SLP database 160) (block 410). The serving agent computes a cryptographic hash of user identifier(s) associated with the entry (block 415) and compares the computed cryptographic hash to the cryptographic hash included in the received SLP query (block 420).

If the cryptographic hashes match (block 420), the serving agent determines whether the SLP query included a public encryption key (block 425). If a public encryption key was included (block 425), the serving agent encrypts connection information associated with the entry using the public encryption key (block 430). The serving agent generates, creates and/or forms an SLP response (e.g., the example SLP response 170 and/or the example SLP response 205) that includes the connection information (which may be encrypted) (block 435) and sends the SLP response to the querying user agent (block 440). If there are more entries in the database (block 445), control proceeds to block 450 to select a next entry (block 450).

If there are no more entries in the database to process (block 445), control exits from the example machine-accessible instructions of FIG. 4.

Returning to block 420, if the cryptographic hashes do not match (block 420), control proceeds to block 445 to determine if there are more entries in the database to process.

While the illustrated example of FIG. 4 sends a response packet for each identified remote desktop session, additionally or alternatively, a response packet could contain connection information for more than one identified remote desktop session.

A processor, a controller and/or any other suitable processing device may be used, configured and/or programmed to execute and/or carry out the example machine-accessible instructions of FIGS. 3A, 3B and/or 4. For example, the example machine-accessible instructions of FIGS. 3A, 3B and/or 4 may be embodied in program code and/or instructions stored on a tangible computer-readable medium, and which can be accessed by a processor, a computer and/or other machine having a processor such as the example processor platform P100 of FIG. 5. Machine-readable instructions comprise, for example, instructions that cause a processor, a computer and/or a machine having a processor to perform one or more particular processes. Alternatively, some or all of the example machine-accessible instructions of FIGS. 3A, 3B and/or 4 may be implemented using any combination(s) of fuses, ASIC(s), PLD(s), FPLD(s), FPGA(s), discrete logic, hardware, firmware, etc. Also, some or all of the example machine-accessible instructions of FIGS. 3A, 3B and/or 4 may be implemented manually or as any combination of any of the foregoing techniques, for example, any combination of firmware, software, discrete logic and/or hardware. Further, many other methods of implementing the example processes of FIGS. 3A, 3B and/or 4 may be employed. For example, the order of execution may be changed, and/or one or more of the blocks and/or interactions described may be changed, eliminated, sub-divided, or combined. Additionally, any or all of the example machine-accessible instructions of FIGS. 3A, 3B and/or 4 may be carried out sequentially and/or carried out in parallel by, for example, separate processing threads, processors, devices, discrete logic, circuits, etc.

As used herein, the term "tangible computer-readable medium" is expressly defined to include any type of computer-readable medium and to expressly exclude propagating signals. As used herein, the term "non-transitory computer-readable medium" is expressly defined to include any type of computer-readable medium and to exclude propagating signals. Example tangible and/or non-transitory computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a network-attached storage device, a server-based storage device, a shared network storage device, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 5.

Figure 5:
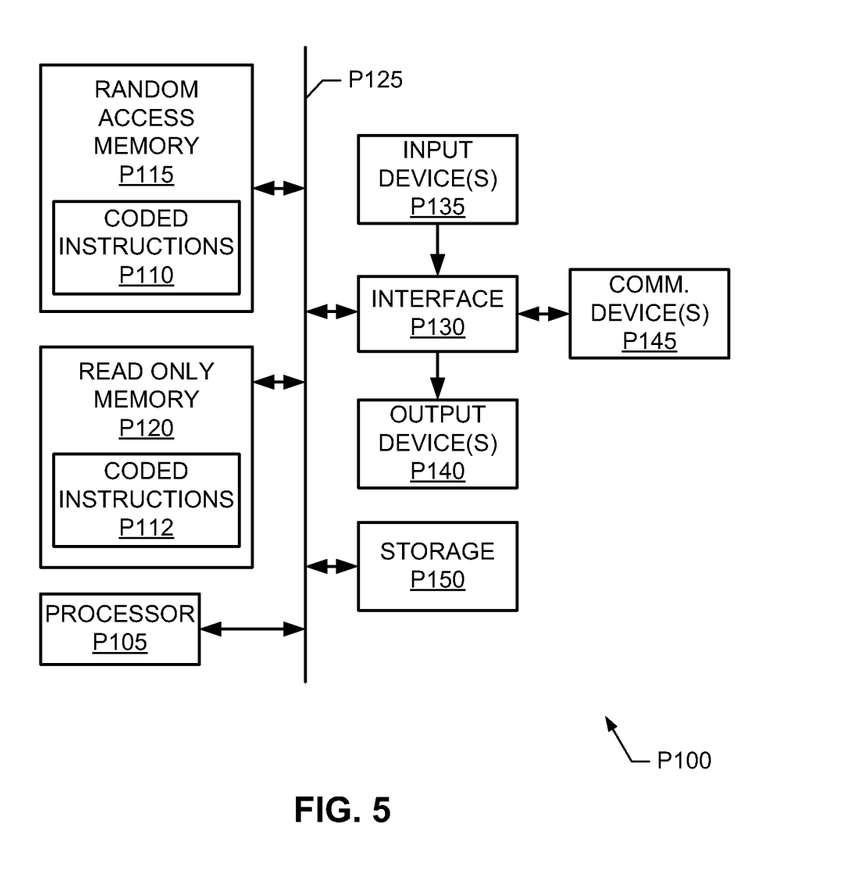
FIG. 5 is a schematic illustration of an example processor platform that may be used and/or programmed to execute the example machine-accessible instructions of FIGS. 3A, 3B and/or 4 to resume remote desktop sessions.

FIG. 5 illustrates an example processor platform P100 capable of executing the example instructions of FIGS. 3A, 3B and/or 4 to implement the example computers 110, 115 and 116, the example remote desktop clients 120, the remote desktop server 125, the example session database 135, the example user agent 140, the example service agent 145, the example directory agent 150 and/or the example SLP database 160 of FIGS. 1 and 2. The example processor platform P100 can be, for example, a router, a PC, a workstation, a residential gateway, a set-top box, a smartphone, a laptop, a netbook, a tablet PC, a game console, a server, and/or any other type of computing device containing a processor.

The processor platform P100 of the instant example includes at least one programmable processor P105. For example, the processor P105 can be implemented by one or more Intel®, AMD®, and/or ARM® microprocessors. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIGS. 3A, 3B and/or 4 to resume remote desktop sessions. Thus, the coded instructions P110, P112 may include the example instructions of FIGS. 3A, 3B and/or 4.

The processor P105 is in communication with the main memory including the non-volatile memory P110 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P110 may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

The interface circuit P130 may also includes one or more communication device(s) 145 such as a network interface card to facilitate exchange of data with other computers, nodes and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive, a network-attached storage device, a server-based storage device, a shared network storage device and/or any other solid-state, magnetic and/or optical storage device. The example storage devices P150 may be used to, for example, store the example coded instructions of FIGS. 3A. 3B and/or 4.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method to resume a remote desktop session, the method comprising:
   multicasting a query to resume the remote desktop session, the query containing a first value representing a user identifier, and the query multicasted from a first computing device to a first intermediate computing device on a first network domain and a second intermediate computing device on a second network domain;
   receiving a first response from the first intermediate computing device or a second response from the second intermediate computing device, the first response including a first address stored at the first intermediate computing device for a first remote desktop session corresponding to the user identifier at the first network domain, and the second response including a second address stored at the second intermediate device for a second remote desktop session corresponding to the user identifier at the second network domain; and
   selecting to resume, at the first computing device, the first remote desktop session based on the first address or the second remote desktop session based on the second address.

2. A method as defined in claim 1, further comprising including a public key in the query, wherein the first and second addresses are encrypted using the public key.

3. A method as defined in claim 1, further comprising computing the first value as a hash of the user identifier.

4. A method as defined in claim 1, further comprising:
   multicasting the query containing the first value to a third intermediate computing device on a third network domain; and
   receiving a third response from the third intermediate computing device, the third response including a third address stored at the third intermediate device for a third remote desktop session corresponding to the user identifier at the third network domain, the third remote desktop session being selectable to resume at the first computing device based on the third address.

5. The method as defined in claim 1, further comprising:
   receiving a third address corresponding to the first intermediate computing device and a fourth address corresponding to the second intermediate computing device from a domain name service, the third address and the fourth address being used to multicast the query.

6. A tangible computer-readable medium comprising instructions which, when executed, cause a machine to at least:
   multicast a query packet containing a user identifier from a first computing device to a first intermediate computing device on a first network domain and to a second intermediate computing device on a second network domain;
   receive a first response packet from the first intermediate computing device or a second response packet from the second intermediate device, the first response packet including a first address stored at the first intermediate computing device for a first remote desktop session corresponding to the user identifier at the first network domain, and the second response packet including a second address stored at the second intermediate device for a second remote desktop session corresponding to the user identifier at the second network domain; and
   select to resume, at the first computing device, the first remote desktop session based on the first address or the second remote desktop session based on the second address.

7. A tangible computer-readable medium as defined in claim 6, further comprising instructions which, when executed, cause the machine to at least:
   include a public key in the query packet, wherein the first and second addresses are encrypted using the public key.

8. A tangible computer-readable medium as defined in claim 6, further comprising instructions which, when executed, cause the machine to at least:
   compute the first value as a hash of the user identifier.

9. A tangible computer-readable medium as defined in claim 6, further comprising instructions which, when executed, cause the machine to at least:
   send the query packet containing the first value to a third intermediate computing device on a third network domain; and receive a third response packet from the third intermediate computing device, the third response packet including a third address stored at the third intermediate device for a third remote desktop session corresponding to the user identifier at the third network domain, the third remote desktop session selectable to resume at the first computing device based on the third address.

10. A tangible computer-readable medium as defined in claim 6, further comprising instructions which, when executed, cause the machine to at least:

receive a third address corresponding to the first intermediate computing device and a fourth address corresponding to the second intermediate computing device from a domain name service, the machine to use the third address and the fourth address to multicast the query.

11. A system to resume a remote desktop session, the system comprising:

a first directory agent in a first network domain to receive query packets containing a first user identifier, to receive registration packets containing a second user identifier and a first address, and to send a first response packet containing the first address when the first user identifier matches the second user identifier;

a second directory agent in a second network domain to receive query packets containing the first user identifier, to receive registration packets containing a third user identifier and a second address, and to send a second response packet containing the second address when the first user identifier matches the third user identifier; and a user agent in a third network domain to multicast the query packets containing the first user identifier, to receive the first and second response packets, and to resume the remote desktop session using the first address or the second address.

12. A system as defined in claim 11, wherein the user agent receives a third address corresponding to the first directory agent and a fourth address corresponding to the second directory agent, and uses the third address and the fourth address to send the query packets.

13. A system as defined in claim 11, wherein the query packets include a public key.

14. A system as defined in claim 13, wherein the first directory agent encrypts the first address with the public key before sending the response packets, and the second directory agent encrypts the second address with the public key before sending the response packets.

15. A system as defined in claim 11, wherein the first directory agent and the second directory agent discards the query packets when the query packets do not contain a public key.

* * * * *